United States Patent
Liu et al.

(10) Patent No.: US 10,093,186 B2
(45) Date of Patent: Oct. 9, 2018

(54) EMERGENCY STARTUP DEVICE OF ELECTRIC VEHICLE

(71) Applicant: Li-Ho Yao, New Taipei (TW)

(72) Inventors: Chin-Chuan Liu, Kaohsiung (TW); Li-Ho Yao, New Taipei (TW)

(73) Assignee: Li-Ho Yao, New Taipei (TW)

( * ) Notice: Subject to any disclaimer, the term of this patent is extended or adjusted under 35 U.S.C. 154(b) by 2 days.

(21) Appl. No.: 15/585,279

(22) Filed: May 3, 2017

(65) Prior Publication Data

US 2018/0154775 A1 Jun. 7, 2018

(30) Foreign Application Priority Data

Dec. 2, 2016 (TW) .............................. 105139785 A (51) Int. Cl.
| | |
|---|---|
| *B60R 22/00* | (2006.01) |
| *F02P 9/00* | (2006.01) |
| *H02G 3/00* | (2006.01) |
| *B60L 3/00* | (2006.01) |
| *B60L 11/18* | (2006.01) |
| *H02J 7/00* | (2006.01) |

(52) U.S. Cl.
CPC .............. *B60L 3/0046* (2013.01); *B60L 11/18* (2013.01); *B60L 11/1868* (2013.01); *H02J 7/007* (2013.01); *B60L 2210/10* (2013.01); *B60Y 2200/92* (2013.01)

(58) Field of Classification Search
CPC .......... B60L 3/0046; B60L 3/00; B60L 11/18; B60L 11/1868; H02J 7/00; H02J 7/007; H02J 7/14; H02J 7/1423; H02J 9/00; H02M 3/155; H02P 27/00

USPC ...... 307/10.2, 9.1, 43, 66, 64; 320/107, 109, 320/110
IPC ......... B60L 3/0046,3/00, 11/18, 11/1868; H02J 7/00, 7/007, 7/14, 7/1423
See application file for complete search history.

(56) References Cited

U.S. PATENT DOCUMENTS 5,637,978 A * 6/1997 Kellett .................. H02J 7/0054
320/104
8,143,843 B2 3/2012 Ichikawa
(Continued)

FOREIGN PATENT DOCUMENTS

| CN | 103568996 A | 2/2014 |
|---|---|---|
| CN | 102862471 B | 6/2015 |
| TW | M519082 U | 3/2016 |

*Primary Examiner* — Rexford Barnie
*Assistant Examiner* — Jagdeep Dhillon
(74) *Attorney, Agent, or Firm* — Alan D. Kamrath; Kamrath IP Lawfirm, P.A.

(57) ABSTRACT

An emergency startup device of an electric vehicle has a high-voltage power battery, a motor driver, a high-voltage control box, a vehicle controller, a low-voltage DC battery, and an emergency starter. The vehicle controller turns on or off the high-voltage control box. When the low-voltage DC battery does not have enough electricity to provide electricity to the vehicle controller, the vehicle controller may not turn on the high-voltage control box, the high-voltage power battery may not provide electricity to the motor driver, and the electric vehicle may not be driven. When the emergency starter is operated, the high-voltage power battery charges the low-voltage DC battery through the emergency starter. Then, the low-voltage DC battery provides enough electricity to the vehicle controller, and the electric vehicle is normally driven.

9 Claims, 4 Drawing Sheets

(56) References Cited

U.S. PATENT DOCUMENTS

| | | | | |
|---|---|---|---|---|
| 2001/0035733 A1* | 11/2001 | Murphy | ............... | H02J 7/0075 320/107 |
| 2010/0283242 A1* | 11/2010 | Dooley | ................. | F02C 7/268 290/31 |
| 2013/0116876 A1* | 5/2013 | Park | ....................... | B60L 3/00 701/22 |
| 2013/0231817 A1* | 9/2013 | Werner | .................. | B60K 6/48 701/22 |
| 2015/0336460 A1* | 11/2015 | Stoller | ............... | B60L 11/1868 307/10.1 |
| 2016/0089986 A1* | 3/2016 | Maeno | ................. | B60K 16/00 320/101 |
| 2017/0334376 A1* | 11/2017 | Chen | ................... | H02J 7/1438 |

\* cited by examiner

EMERGENCY STARTUP DEVICE OF ELECTRIC VEHICLE

CROSS-REFERENCE TO RELATED APPLICATIONS

This application claims the priority benefit of TW application serial No. 105139785, filed on Dec. 2, 2016. The entirety of the above-mentioned patent application is hereby incorporated by reference herein and made a part of specification.

BACKGROUND OF THE INVENTION

1. Field of the Invention

The present invention relates to an emergency startup device of an electric vehicle, and particularly to an emergency startup device to start up an electric vehicle when a low voltage battery does not have enough power to start up the electric vehicle.

2. Description of the Related Art

A conventional hybrid electric vehicle, as recited in Taiwan patent No. M519082, comprises an engine module and an electric motor module. Petroleum or electricity may be used as power source to drive the hybrid electric vehicle.

Figure 4:
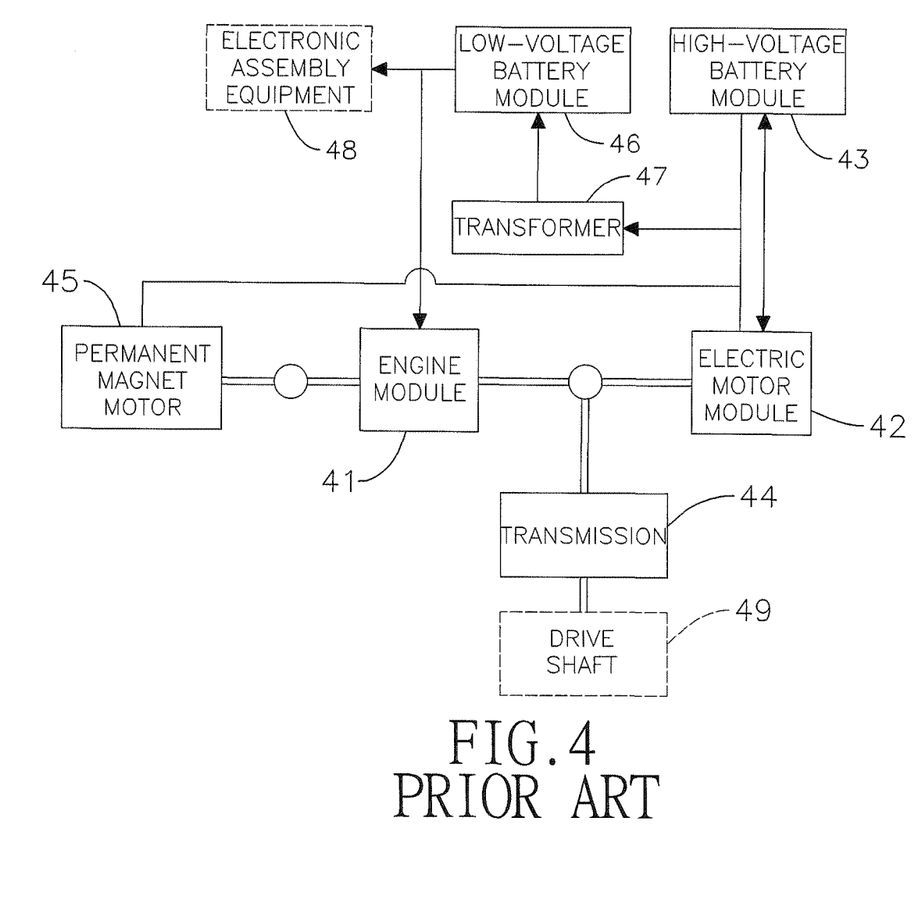
FIG. 4 is a block diagram of a conventional hybrid electric vehicle.

With reference to FIG. 4, the hybrid electric vehicle comprises an engine module 41, an electric motor module 42, a high-voltage battery module 43, a transmission 44, a permanent magnet motor 45, a low-voltage battery module 46, a transformer 47, an electronic assembly equipment 48, and a drive shaft 49.

The engine module 41 uses the petroleum as power source, and the electric motor module 42 uses the electricity as power source. The transmission 44 is selectively connected to the engine module 41 or the electric motor module 42.

When the transmission 44 is connected to the engine module 41, the hybrid electric vehicle may use the petroleum as power source to drive the engine module 41. The engine module 41 may further drive the drive shaft 49 through the transmission 44, and the hybrid electric vehicle may be driven.

When the transmission 44 is connected to the electric motor module 42, the hybrid electric vehicle may use the electricity as power source to drive the electric motor module 42. The electric motor module 42 may further drive the drive shaft 49 through the transmission 44, and the hybrid electric vehicle may be driven.

The high-voltage battery module 43 is electronically connected to the electric motor module 42, and provides the electricity to the electric motor module 42. The transformer 47 is electronically connected between the high-voltage battery module 43 and the low-voltage battery module 46, and the electricity provided by the high-voltage battery module 43 is transformed by the transformer 47 to charge the low-voltage battery module 46.

The low-voltage battery module 46 is further electronically connected to the electronic assembly equipment 48, and provides the electricity to the electronic assembly equipment 48.

The permanent-magnet motor 45 is connected to the engine module 41, and is driven by the engine module 41 to generate electricity. The permanent-magnet motor 45 is further electronically connected to the transformer 47 and the high-voltage battery module 43, and the electricity generated by the permanent-magnet motor 45 is transformed by the transformer 47 to charge the high-voltage battery module 43.

The high-voltage battery module 43 is controlled by a processor of the electronic assembly equipment 48 to provide electricity to the electric motor module 42 and to avoid sudden unintended acceleration (SUA) of the hybrid electric vehicle.

When the low-voltage battery module 46 has no electricity, the electronic assembly equipment 48 may not normally operate. Therefore, the processor of the electronic assembly equipment 48 may not control the high-voltage battery module 43, and the high-voltage battery module 43 may not provide electricity to the electric motor module 42. Then, the hybrid electric vehicle may not be driven by the electricity.

However, the engine module 41 may drive the permanent-magnet motor 45, and the permanent-magnet motor 45 may generate the electricity. Then, the electricity generated by the permanent-magnet motor 45 may be transformed by the transformer 47 to charge the low-voltage battery module 46. Therefore, the hybrid electric vehicle may be normally driven.

Nevertheless, an electric vehicle may not comprise the engine module 47. Therefore, the electric vehicle may only use electricity as the power source. When the low-voltage battery module 46 has no electricity, the electronic assembly equipment 48 may not normally operate, and the high-voltage battery module 43 may not be controlled to drive the electric vehicle. Further, the permanent-magnet motor 45 may not be driven by the engine module 41 to generate the electricity, and the low-voltage battery module 46 may not be charged.

Therefore, even if the high-voltage battery module 43 has the electricity, the high-voltage battery module 43 may not provide the electricity to the electric motor module 42. Since the low-voltage battery module 46 has no electricity, the electronic assembly equipment 48 may not normally control the high-voltage battery module 43 to provide the electricity to the electric motor module 42. Then, the electric vehicle may not be driven. A user needs to find an outer electricity source to charge the low-voltage battery module 46, and then, the electric vehicle may be driven. Therefore, the electric vehicle needs to be improved.

SUMMARY OF THE INVENTION

An objective of the present invention is to provide an emergency startup device of an electric vehicle. The emergency startup device of the electric vehicle may start up the electric vehicle when a low voltage battery does not have enough power to start up the electric vehicle.

To achieve the foregoing objective, the emergency startup device comprises a high-voltage power battery, a motor driver, a high-voltage control box, a vehicle controller, a low-voltage DC battery, a DC-to-DC converter, a startup switch, and an emergency starter.

The motor driver drives a power motor.

The high-voltage control box comprises an input port and an output port. The input port of the high-voltage control box is electronically connected to the high-voltage power battery, and the output port of the high-voltage control box is electronically connected to the motor driver.

The vehicle controller is electronically connected to the high-voltage control box to turn on or turn off the high-voltage control box. When the high-voltage control box is turned on, the high-voltage power battery provides electricity to the motor driver through the high-voltage control box, and the motor driver may drive the power motor.

The DC-to-DC converter is electronically connected between the low-voltage DC battery and the output port of the high-voltage control box. When the high-voltage control box is turned on, the high-voltage power battery is electronically connected to the DC-to-DC converter through the high-voltage control box to charge the low-voltage DC battery through the DC-to-DC converter.

The startup switch is electronically connected between the low-voltage DC battery and the vehicle controller. When the startup switch is turned on, the low-voltage DC battery provides electricity to the vehicle controller through the startup switch.

The emergency starter comprises a switch module and a switch control module.

The switch module is electronically connected between the high-voltage power battery and the DC-to-DC converter.

The switch control module is electronically connected to the switch module to turn on or turn off the switch module. When the switch module is turned on, the high-voltage power battery is electronically connected to the DC-to-DC converter through the switch module to charge the low-voltage DC battery through the DC-to-DC converter.

When the low-voltage DC battery does not have enough electricity, even if the startup switch is turned on, the low-voltage DC battery may not provide enough electricity to the vehicle controller, and then, the vehicle controller may not normally operate. Further, the vehicle controller may not turn on the high-voltage control box.

Namely, the high-voltage power battery may not provide the electricity to the motor driver and the DC-to-DC converter through the high-voltage control box. Therefore, the high-voltage power battery may not charge the low-voltage DC battery through the DC-to-DC converter.

However, the present invention further comprises the emergency starter. A user may operate the switch control module of the emergency starter to turn on the switch module. Therefore, the high-voltage power battery may be electronically connected to the DC-to-DC converter through the switch module, and the high-voltage power battery may further charge the low-voltage DC battery through the switch module and the DC-to-DC converter. The low-voltage DC battery may be charged and have enough electricity. Then, the low-voltage DC battery may provide enough electricity to the vehicle controller, and the vehicle controller may be normally operated to turn on the high-voltage control box. Then, the electric vehicle may be normally driven.

Other objectives, advantages and novel features of the invention will become more apparent from the following detailed description when taken in conjunction with the accompanying drawings.

DETAILED DESCRIPTION OF THE INVENTION

Figure 1:
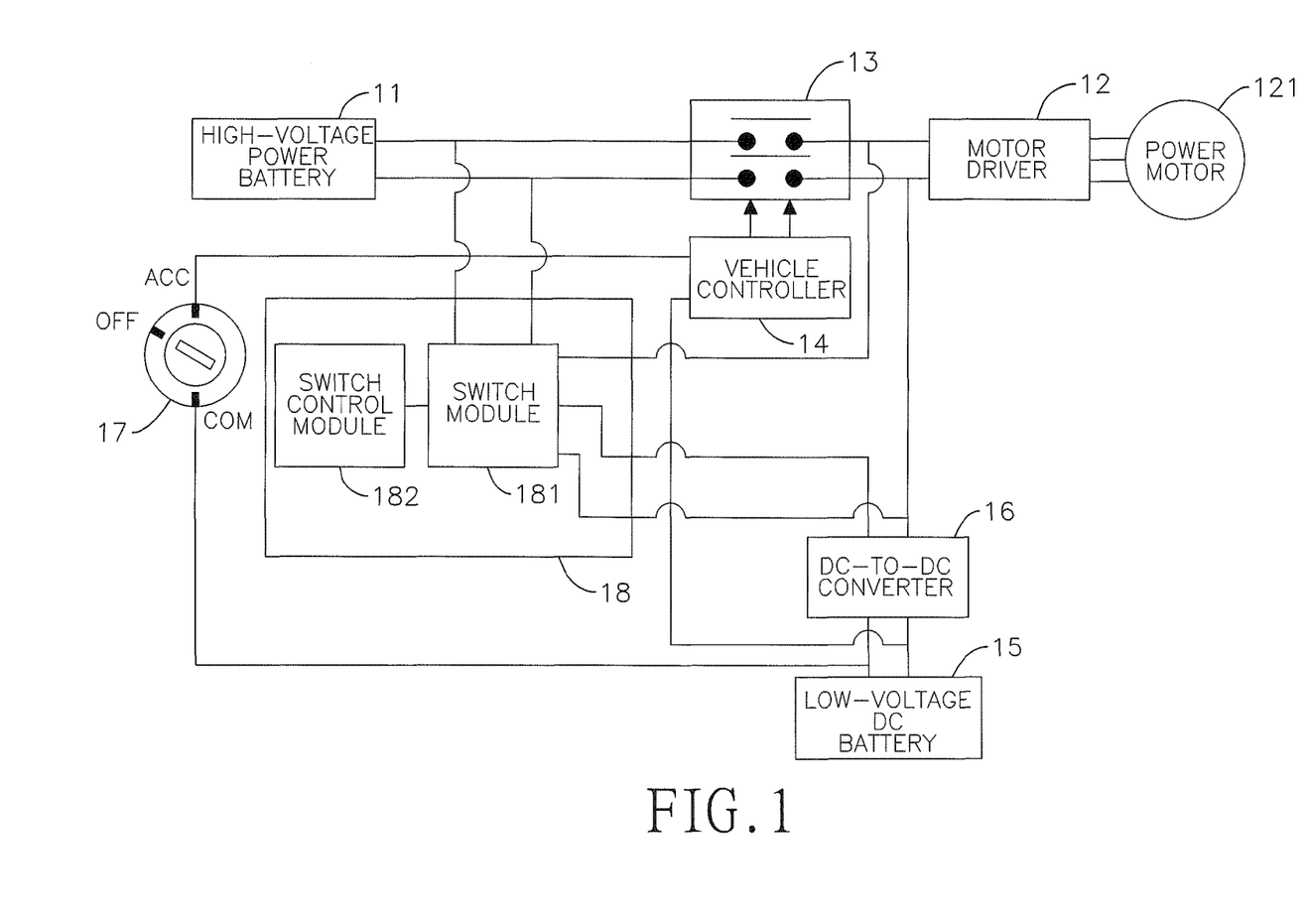
FIG. 1 is a block diagram of an emergency startup device of an electric vehicle.

With reference to FIG. 1, the present invention is an emergency startup device of an electric vehicle. The emergency startup device comprises a high-voltage power battery 11, a motor driver 12, a high-voltage control box 13, a vehicle controller 14, a low-voltage DC battery 15, a DC-to-DC converter 16, a startup switch 17, and an emergency starter 18.

The motor driver 12 drives a power motor 121 of the electric vehicle.

The high-voltage control box 13 comprises an input port and an output port. The input port of the high-voltage control box 13 is electronically connected to the high-voltage power battery 11, and the output port of the high-voltage control box 13 is electronically connected to the motor driver 12. The vehicle controller 14 is electronically connected to the high-voltage control box 13 to turn on or turn off the high-voltage control box 13. When the high-voltage control box 13 is turned on, the high-voltage control box 13 provides electricity to the motor driver 12 through the high-voltage control box 13, and the motor driver 12 may drive the power motor 121.

The DC-to-DC converter 16 is electronically connected between the low-voltage DC battery 15 and the output port of the high-voltage control box 13. When the high-voltage control box 13 is turned on, the high-voltage power battery 11 is electronically connected to the DC-to-DC converter 16 through the high-voltage control box 13 to charge the low-voltage DC battery 15 through the DC-to-DC converter 16.

The startup switch 17 is electronically connected between the low-voltage DC battery 15 and the vehicle controller 14. When the startup switch 17 is turned on, the low-voltage DC battery 15 provides electricity to the vehicle controller 14 through the startup switch 17.

The emergency starter 18 comprises a switch module 181 and a switch control module 182. The switch module 181 is electronically connected between the high-voltage power battery 11 and the DC-to-DC converter 16. The switch control module 182 is electronically connected to the switch module 181 to turn on or turn off the switch module 181. When the switch module 181 is turned on, the high-voltage power battery 11 is electronically connected to the DC-to-DC converter 16 through the switch module 181 to charge the low-voltage DC battery 15 through the DC-to-DC converter 16.

When the low-voltage DC battery 15 does not have enough electricity, even if the startup switch 17 is turned from the off terminal (OFF) to the power terminal (ACC) to make the common terminal (COM) electronically connected to the power terminal (ACC), the low-voltage DC battery 15 may not provide enough electricity to the vehicle controller 14. Therefore, the vehicle controller 14 may not normally operate, and further, the vehicle controller 14 may not turn on the high-voltage control box 13.

Namely, the high-voltage power battery 11 may not provide the electricity to the motor driver 12 and the DC-to-DC converter 16 through the high-voltage control box 13. Therefore, the high-voltage power battery 11 may not charge the low-voltage DC battery 15 through the DC-to-DC converter 16.

However, the present invention further comprises the emergency starter 18. A user may operate the switch control module 182 of the emergency starter 18 to turn on the switch module 181. Therefore, the high-voltage power battery 11 may be electronically connected to the DC-to-DC converter 16 through the switch module 181, and the high-voltage power battery 11 may further charge the low-voltage DC battery 15 through the switch module 181 and the DC-to-DC converter 16. The low-voltage DC battery 15 may be charged and have enough electricity. Then, the low-voltage DC battery 15 may provide enough electricity to the vehicle controller 14, and the vehicle controller 14 may normally operate to turn on the high-voltage control box 13. Then, the electric vehicle may be normally driven.

Figure 2:
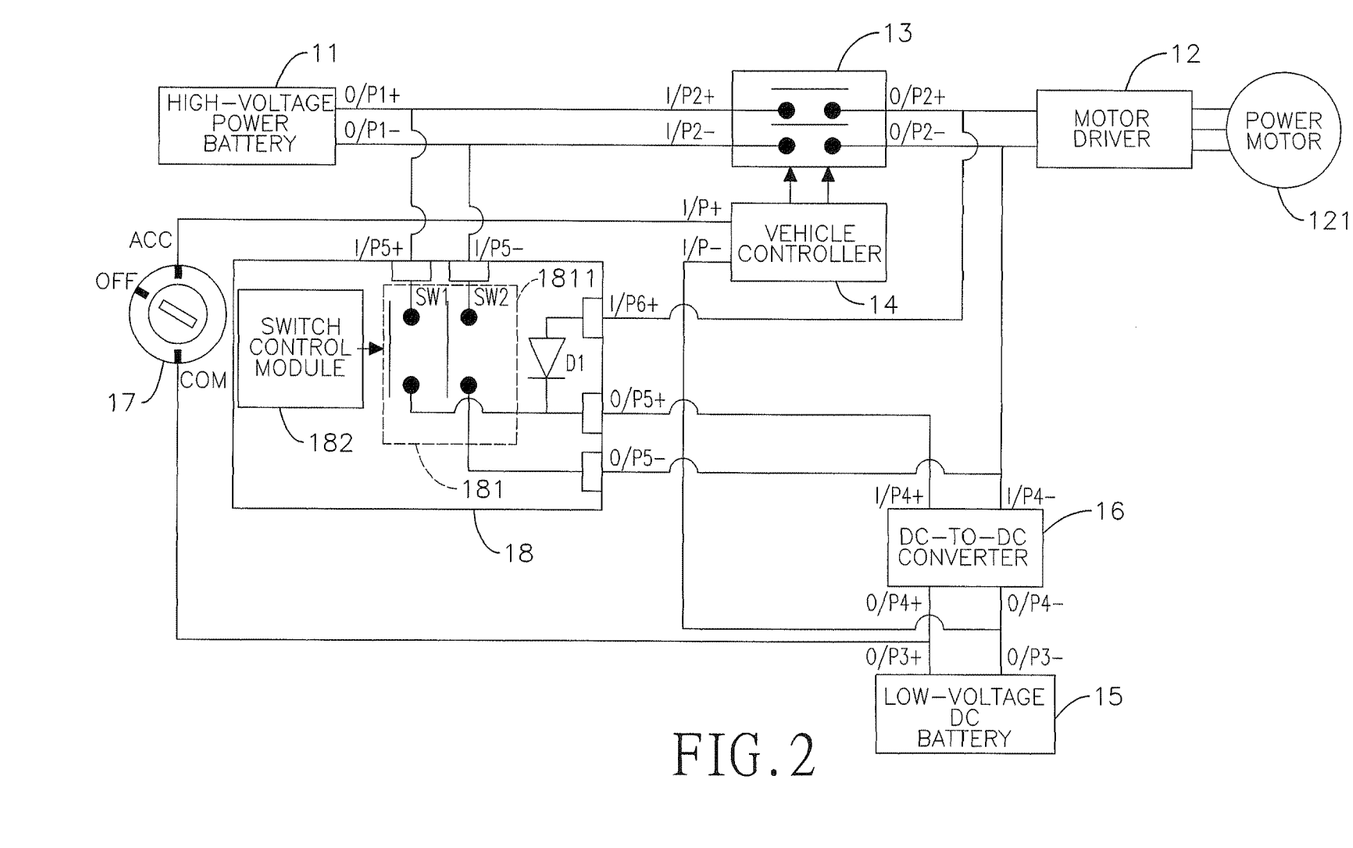
FIG. 2 is a block diagram of a first embodiment of the emergency startup device of FIG. 1.

With reference to FIG. 2, a first embodiment of the emergency startup device is shown. In the first embodiment, the high-voltage power battery 11 comprises a first positive electrode port O/P1+ and a first negative electrode port O/P1−. The input port of the high-voltage control box 13 comprises a second input positive electrode I/P2+ and a second input negative electrode I/P2−. The first positive electrode port O/P1+ of the high-voltage power battery 11 is electronically connected to the second input positive electrode I/P2+ of the high-voltage control box 13. The first negative electrode port O/P1− of the high-voltage power battery 11 is electronically connected to the second input negative electrode I/P2− of the high-voltage control box 13.

The output port of the high-voltage control box 13 comprises a second output positive electrode O/P2+ and a second output negative electrode O/P2−.

The vehicle controller 14 comprises a positive electrode port I/P+ and a negative electrode port I/P−.

The low-voltage DC battery 15 comprises a third positive electrode port O/P3+ and a third negative electrode port O/P3−. The third negative electrode port O/P3− of the low-voltage DC battery 15 is electronically connected to the negative electrode port I/P− of the vehicle controller 14.

The DC-to-DC converter 16 comprises a fourth input positive port I/P4+, a fourth input negative port I/P4−, a fourth output positive port O/P4+, and a fourth output negative port O/P4−. The fourth output positive port O/P4+ of the DC-to-DC converter 16 is electronically connected to the third positive electrode port O/P3+ of the low-voltage DC battery 15. The fourth output negative port O/P4− of the DC-to-DC converter 16 is electronically connected to the third negative electrode port O/P3− of the low-voltage DC battery 15.

The startup switch 17 comprises a common terminal (COM), an off terminal (OFF), and a power terminal (ACC). The common terminal (COM) of the startup switch 17 is selectively electronically connected to the off terminal (OFF) or the power terminal (ACC). The common terminal (COM) of the startup switch 17 is electronically connected to the third positive electrode port O/P3+ of the low-voltage DC battery 15. The power terminal (ACC) of the startup switch 17 is electronically connected to the positive electrode port I/P+ of the vehicle controller 14. In the first embodiment, the startup switch 17 is an ignition switch. The user may insert a key into the ignition switch, and may turn the key to make the common terminal (COM) electronically connected to either the off terminal (OFF) or the power terminal (ACC).

The switch module 181 of the emergency starter 18 comprises a switch unit 1811, a first diode D1, a fifth input positive electrode I/P5+, a fifth input negative electrode I/P5−, a fifth output positive electrode O/P5+, a fifth output negative electrode O/P5−, and a sixth positive port I/P6+. In the first embodiment, the switch unit 1811 comprises a first switch SW1 and a second switch SW2. The first switch SW1 of the switch unit 1811 is electronically connected between the fifth input positive electrode I/P5+ and the fifth output positive electrode O/P5+, and the second switch SW2 of the switch unit 1811 is electronically connected between the fifth input negative electrode I/P5− and the fifth output negative electrode O/P5−. An anode of the first diode D1 is electronically connected to the sixth positive port I/P6+, and a cathode of the first diode D1 is electronically connected to the fifth output positive electrode O/P5+.

The fifth input positive electrode I/P5+ of the switch module 181 is further electronically connected to the first positive electrode port O/P1+ of the high-voltage power battery 11, and the fifth input negative electrode I/P5− of the switch module 181 is further electronically connected to the first negative electrode port O/P1− of the high-voltage power battery 11. The fifth output positive electrode O/P5+ of the switch module 181 is further electronically connected to the fourth input positive port I/P4+ of the DC-to-DC converter 16, and the fifth output negative electrode O/P5− of the switch module 181 is further electronically connected to the fourth input negative port I/P4− of the DC-to-DC converter 16. The sixth positive port I/P6+ of the switch module 181 is further electronically connected to the second output positive electrode O/P2+ of the high-voltage control box 13.

In the first embodiment, the switch control module 182 of the emergency starter 18 is a button. When the user presses the button, the first switch SW1 and the second switch SW2 of the switch module 181 are turned on.

Therefore, when the low-voltage DC battery 15 does not have enough electricity, the user may press the switch control module 182 of the emergency starter 18. Then, the first switch SW1 and the second switch SW2 of the switch module 181 are turned on, and further, the high-voltage power battery 11 may be electronically connected to the DC-to-DC converter 16 through the switch module 181. The high-voltage power battery 11 may charge the low-voltage DC battery 15 through the switch module 181 and the DC-to-DC converter 16, and the low-voltage DC battery 15 may provide enough electricity to the vehicle controller 14. Then, the electric vehicle may be emergently started.

Figure 3:
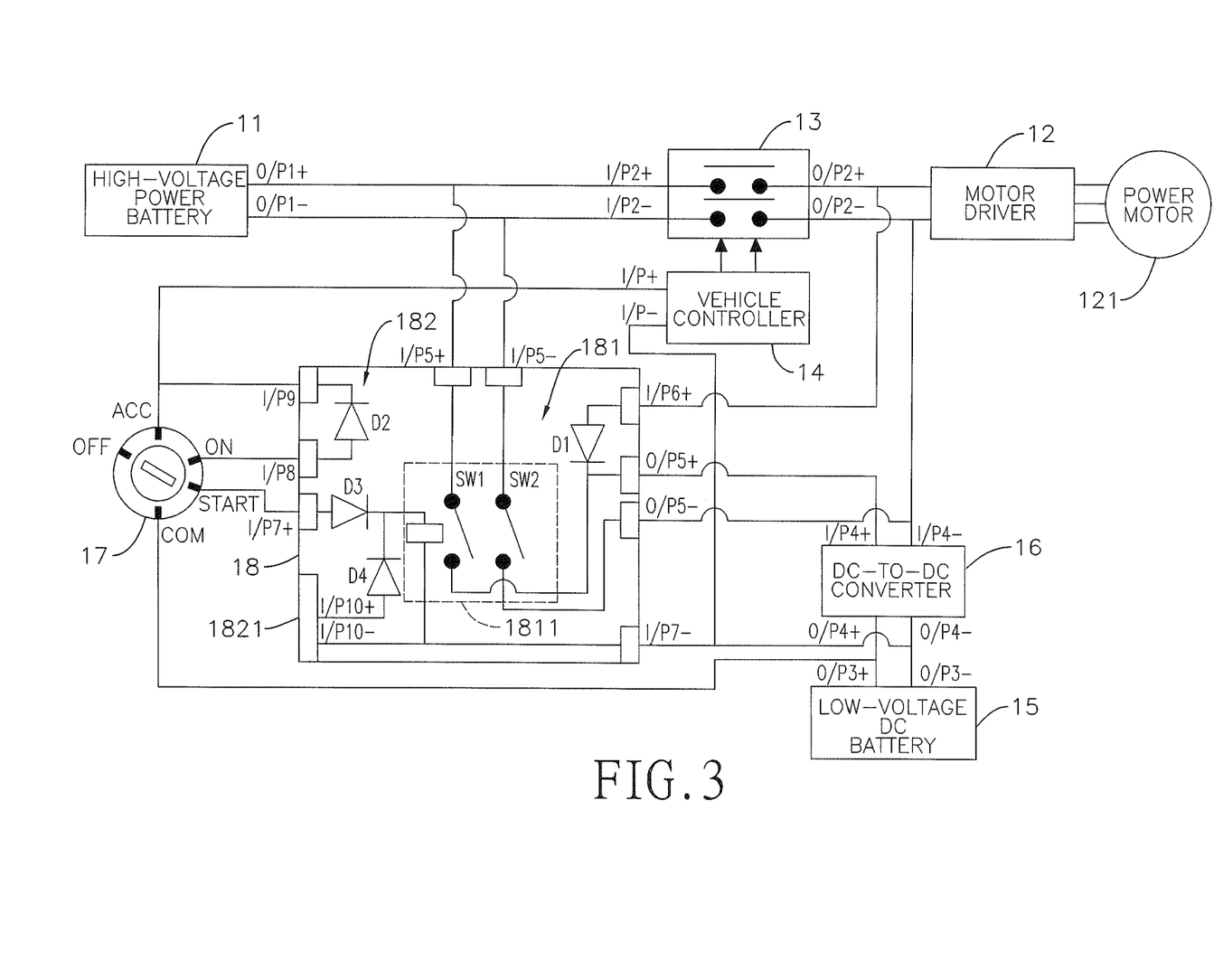
FIG. 3 is a block diagram of a second embodiment of the emergency startup device of FIG. 1.

With reference to FIG. 3, a second embodiment of the emergency startup device is shown. In the second embodiment, the startup switch 17 further comprises an ON terminal (ON) and a start terminal (START). The common terminal (COM) of the startup switch 17 is selectively electronically connected to the off terminal (OFF), the power terminal (ACC), the ON terminal (ON), or the start terminal (START). In the second embodiment, the startup switch 17 is an ignition switch. The user may insert a key into the ignition switch, and may turn the key to make the common terminal (COM) electronically connected to one of the off terminal (OFF), the power terminal (ACC), the ON terminal (ON), and the start terminal (START). When the user turns the key to make the common terminal (COM) electronically connected to the start terminal (START), the key may be forced by a spring to return to the ON terminal (ON), and the common terminal (COM) is electronically connected to the ON terminal (ON).

The switch control module 182 of the emergency starter 18 further comprises a second diode D2, a seventh positive port I/P7+, an eighth connecting port I/P8, and a ninth connecting port I/P9. An anode of the second diode D2 is electronically connected to the eighth connecting port I/P8, and a cathode of the second diode D2 is electronically connected to the ninth connecting port I/P9.

The seventh positive port I/P7+ is further electronically connected to the start terminal (START) of the startup switch 17. The eighth connecting port I/P8 is further electronically connected to the ON terminal (ON) of the startup switch 17. The ninth connecting port I/P9 is further electronically connected to the power terminal (ACC) of the startup switch 17.

The switch control module 182 of the emergency starter 18 further comprises a seventh negative port I/P7−. In the second embodiment, the switch unit 1811 is a relay, and comprises an input circuit 1812 and an output circuit. The input circuit 1812 is electronically connected between the seventh positive port I/P7+ and the seventh negative port I/P7− of the switch control module 182. The output circuit of the switch unit 1811 consists of the first switch SW1 and the second switch SW2.

When the low-voltage DC battery 15 does not have enough electricity, even if the user turns the key inserted in the startup switch 17 from the off terminal (OFF) to the power terminal (ACC) to make the common terminal (COM) electronically connected to the power terminal (ACC), the low-voltage DC battery 15 may not provide enough electricity to the vehicle controller 14. Therefore, the vehicle controller 14 may not normally operate, and further, the vehicle controller 14 may not turn on the high-voltage control box 13.

The user may further turn the key inserted in the startup switch 17 to the start terminal (START) to make the common terminal (COM) electronically connected to the start terminal (START). However, the low-voltage DC battery 15 may not have enough electricity to provide for the vehicle controller 14 to normally operate, but the low-voltage DC battery 15 may still have some electricity. Therefore, when the user further turns the key inserted in the startup switch 17 to the start terminal (START) to make the common terminal (COM) electronically connected to the start terminal (START), the low-voltage DC battery 15 may electronically connect to the input circuit 1812 of the switch unit 1811. Then, the low-voltage DC battery 15 may provide the electricity to the input circuit 1812 of the switch unit 1811, and the first switch SW1 and the second switch SW2 are turned on. Further, the high-voltage power battery 11 may be electronically connected to the DC-to-DC converter 16 through the switch module 181. The high-voltage power battery 11 may charge the low-voltage DC battery 15 through the switch module 181 and the DC-to-DC converter 16.

Besides, when the key inserted in the startup switch 17 is forced by the spring to return to the ON terminal (ON), the common terminal (COM) is electronically connected to the ON terminal (ON). The low-voltage DC battery 15 may be electronically connected to the power terminal (ACC) through the common terminal (COM), the ON terminal (ON), the eighth connecting port I/P8, the second diode D2, and the ninth connecting port I/P9. Further, the low-voltage DC battery 15 may be electronically connected to the vehicle controller 14 through the power terminal (ACC).

Since the low-voltage DC battery 15 is charged by the high-voltage power battery 11 and electronically connected to the vehicle controller 14, the low-voltage DC battery 15 may have enough electricity and may provide the electricity to the vehicle controller 14. Then, the vehicle controller 14 may normally operate, and the electric vehicle may be emergently started.

The switch control module 182 of the emergency starter 18 further comprises a third diode D3, a fourth diode D4, and a power connecting unit 1821. The third diode D3 is electronically connected between the seventh port I/P7 of the switch control module 182 and the input circuit 1812 of the switch unit 1811. An anode of the third diode D3 is electronically connected to the seventh port I/P7 of the switch control module 182, and a cathode of the the of the third diode D3 is electronically connected to the input circuit 1812 of the switch unit 1811.

The power connecting unit 1821 comprises a tenth positive connecting port I/P10+ and a tenth negative connecting port I/P10−. The tenth positive connecting port I/P10+ of the input circuit 1812 is electronically connected to an anode of the fourth diode D4, and a cathode of the fourth diode D4 is electronically connected to the cathode of the third diode D3. The tenth negative connecting port I/P10− of the power connecting unit 1821 is electronically connected to the seventh negative port I/P7−. In the second embodiment, the power connecting unit 1821 is a USB connecting port.

When the low-voltage DC battery 15 totally runs out of the electricity, the low-voltage DC battery 15 may not drive the input circuit 1812 of the switch unit 1811, and the first switch SW1 and the second switch SW2 may not be turned on. Therefore, even if the user turns the key inserted in the startup switch 17 to the start terminal (START) to make the common terminal (COM) electronically connected to the start terminal (START), the low-voltage DC battery 15 may not drive the input circuit 1812 of the switch unit 1811 to turn on the first switch SW1 and the second switch SW2.

However, the user may further electronically connect the power connecting unit 1821 to a power bank through a connecting line, and the power bank may provide electricity. The power bank may provide the electricity to the input circuit 1812 of the switch unit 1811 through the third diode D3 and the fourth diode D4. Therefore, the first switch SW1 and the second switch SW2 may be turned on, and the high-voltage power battery 11 may be electronically connected to the DC-to-DC converter 16 through the switch module 181. The high-voltage power battery 11 may charge the low-voltage DC battery 15 through the switch module 181 and the DC-to-DC converter 16. Then, the low-voltage DC battery 15 may have enough electricity and may provide the electricity to the vehicle controller 14. The vehicle controller 14 may normally operate, and the electric vehicle may be emergently started.

In the second embodiment, a voltage of the electricity provided by the low-voltage DC battery 15 is 12 volts. However, a conventional power bank provides electricity having 5 volts voltage. The conventional power bank may not directly charge the low-voltage DC battery 15, but the conventional power bank may drive the input circuit 1812 of the switch unit 1811 to turn on the first switch SW1 and the second switch SW2. Therefore, even if the conventional power bank may provide electricity having 5 volts voltage, the input circuit 1812 of the switch unit 1811 may be driven to turn on the first switch SW1 and the second switch SW2. Then, the high-voltage power battery 11 may charge the low-voltage DC battery 15, and the vehicle controller 14 may normally operate to emergently start the electric vehicle.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. An emergency startup device of an electric vehicle, comprising:
a high-voltage power battery;
a motor driver, driving a power motor;

a high-voltage control box, comprising
an input port electronically connected to the high-voltage power battery; and
an output port electronically connected to the motor driver;
a vehicle controller, electronically connected to the high-voltage control box to turn on or turn off the high-voltage control box; wherein when the high-voltage control box is turned on, the high-voltage power battery provides electricity to the motor driver through the high-voltage control box, and the motor driver drives the power motor;
a low-voltage DC battery;
a DC-to-DC converter, electronically connected between the low-voltage DC battery and the output port of the high-voltage control box; wherein when the high-voltage control box is turned on, the high-voltage power battery further provides the electricity to charge the low-voltage DC battery through the DC-to-DC converter to charge the low voltage DC battery;
a startup switch, electronically connected between the low-voltage DC battery and the vehicle controller; wherein when the startup switch is turned on, the low-voltage DC battery provides electricity to the vehicle controller through the startup switch;
an emergency starter, comprising:
a switch module, electronically connected between the high-voltage power battery and the DC-to-DC converter; and
a switch control module, electronically connected to the switch module to turn on or turn off the switch module; wherein when the switch module is turned on, the high-voltage power battery is electrically connected to the DC-to-DC converter through the switch module to charge the low-voltage DC battery through the DC-to-DC converter.

2. The emergency startup device as claimed in claim 1, wherein:
the high-voltage power battery comprises a first positive electrode port and a first negative electrode port;
the input port of the high-voltage control box comprises a second input positive electrode and a second input negative electrode;
the output port of the high-voltage control box comprises a second output positive electrode and a second output negative electrode;
the first positive electrode port of the high-voltage power battery is electronically connected to the second input positive electrode of the high-voltage control box;
the first negative electrode port of the high-voltage power battery is electronically connected to the second input negative electrode of the high-voltage control box;
the vehicle controller comprises a positive electrode port and a negative electrode port;
the low-voltage DC battery comprises a third positive electrode port and a third negative electrode port;
the third negative electrode port of the low-voltage DC battery is electronically connected to the negative electrode port of the vehicle controller;
the DC-to-DC converter comprises a fourth input positive port, a fourth input negative port, a fourth output positive port, and a fourth output negative port;
the fourth output positive port of the DC-to-DC converter is electronically connected to the third positive electrode port of the low-voltage DC battery;
the fourth output negative port of the DC-to-DC converter is electronically connected to the third negative electrode port of the low-voltage DC battery;
the startup switch comprises a common terminal, an OFF terminal, and a power terminal;
the common terminal of the startup switch is selectively electronically connected to the OFF terminal or the power terminal of the startup switch;
the common terminal of the startup switch is electronically connected to the third positive electrode port of the low-voltage DC battery;
the power terminal of the startup switch is electronically connected to the positive electrode port of the vehicle controller;
the switch module of the emergency starter comprises a switch unit, a first diode, a fifth input positive electrode, a fifth input negative electrode, a fifth output positive electrode, a fifth output negative electrode, and a sixth positive port;
the switch unit comprises a first switch and a second switch;
the first switch of the switch unit is electronically connected between the fifth input positive electrode and the fifth output positive electrode;
the second switch of the switch unit is electronically connected between the fifth input negative electrode and the fifth output negative electrode;
an anode of the first diode is electronically connected to the sixth positive port;
a cathode of the first diode is electronically connected to the fifth output positive electrode;
the fifth input positive electrode of the switch module is electronically connected to the first positive electrode port of the high-voltage power battery;
the fifth input negative electrode of the switch module is electronically connected to the first negative electrode port of the high-voltage power battery;
the fifth output positive electrode of the switch module is electronically connected to the fourth input positive port of the DC-to-DC converter;
the fifth output negative electrode of the switch module is electronically connected to the fourth input negative port of the DC-to-DC converter;
the sixth positive port of the switch module is electronically connected to the second output positive electrode of the high-voltage control box.

3. The emergency startup device as claimed in claim 2, wherein:
the switch control module of the emergency starter is a button;
when the button is pressed, the first switch and the second switch of the switch module are turned on.

4. The emergency startup device as claimed in claim 1, wherein:
the high-voltage power battery comprises a first positive electrode port and a first negative electrode port;
the input port of the high-voltage control box comprises a second input positive electrode and a second input negative electrode;
the output port of the high-voltage control box comprises a second output positive electrode and a second output negative electrode;
the first positive electrode port of the high-voltage power battery is electronically connected to the second input positive electrode of the high-voltage control box;

the first negative electrode port of the high-voltage power battery is electronically connected to the second input negative electrode of the high-voltage control box;

the vehicle controller comprises a positive electrode port and a negative electrode port;

the low-voltage DC battery comprises a third positive electrode port and a third negative electrode port;

the third negative electrode port of the low-voltage DC battery is electronically connected to the negative electrode port of the vehicle controller;

the DC-to-DC converter comprises a fourth input positive port, a fourth input negative port, a fourth output positive port, and a fourth output negative port;

the fourth output positive port of the DC-to-DC converter is electronically connected to the third positive electrode port of the low-voltage DC battery;

the fourth output negative port of the DC-to-DC converter is electronically connected to the third negative electrode port of the low-voltage DC battery;

the startup switch comprises a common terminal, an OFF terminal, a power terminal, an ON terminal and a start terminal;

the common terminal of the startup switch is selectively electronically connected to the OFF terminal, the power terminal, the ON terminal, or the start terminal of the startup switch;

the common terminal of the startup switch is electronically connected to the third positive electrode port of the low-voltage DC battery;

the power terminal of the startup switch is electronically connected to the positive electrode port of the vehicle controller;

the switch module of the emergency starter comprises a switch unit, a first diode, a fifth input positive electrode, a fifth input negative electrode, a fifth output positive electrode, a fifth output negative electrode, and a sixth positive port;

the switch unit comprises a first switch and a second switch;

the first switch of the switch unit is electronically connected between the fifth input positive electrode and the fifth output positive electrode;

the second switch of the switch unit is electronically connected between the fifth input negative electrode and the fifth output negative electrode;

an anode of the first diode is electronically connected to the sixth positive port;

a cathode of the first diode is electronically connected to the fifth output positive electrode;

the fifth input positive electrode of the switch module is electronically connected to the first positive electrode port of the high-voltage power battery;

the fifth input negative electrode of the switch module is electronically connected to the first negative electrode port of the high-voltage power battery;

the fifth output positive electrode of the switch module is electronically connected to the fourth input positive port of the DC-to-DC converter;

the fifth output negative electrode of the switch module is electronically connected to the fourth input negative port of the DC-to-DC converter;

the sixth positive port of the switch module is electronically connected to the second output positive electrode of the high-voltage control box;

the switch control module of the emergency starter further comprises a seventh positive port and a seventh negative port;

the seventh positive port is electronically connected to the start terminal of the startup switch;

the switch unit is a relay, and comprises an input circuit and an output circuit;

the input circuit of the switch unit is electronically connected between the seventh positive port and the seventh negative port of the switch control module;

the output circuit of the switch unit consists of the first switch and the second switch.

5. The emergency startup device as claimed in claim 4, wherein:

the switch control module of the emergency starter further comprises a second diode, an eighth connecting port, and a ninth connecting port;

an anode of the second diode is electronically connected to the eighth connecting port;

a cathode of the second diode is electronically connected to the ninth connecting port;

the eighth connecting port is electronically connected to the ON terminal of the startup switch;

the ninth connecting port is electronically connected to the power terminal of the startup switch.

6. The emergency startup device as claimed in claim 4, wherein:

the switch control module of the emergency starter further comprises a third diode, a fourth diode, and a power connecting unit;

the third diode is electronically connected between the seventh port of the switch control module and the input circuit of the switch unit;

an anode of the third diode is electronically connected to the seventh port of the switch control module;

a cathode of the third diode is electronically connected to the input circuit of the switch unit;

the power connecting unit comprises a tenth positive connecting port and a tenth negative connecting port;

the tenth positive connecting port of the input circuit is electronically connected to an anode of the fourth diode;

the tenth negative connecting port of the power connecting unit is electronically connected to the seventh negative port;

a cathode of the fourth diode is electronically connected to the cathode of the third diode.

7. The emergency startup device as claimed in claim 6, wherein:

the power connecting unit is a USB connecting port.

8. The emergency startup device as claimed in claim 5, wherein:

the switch control module of the emergency starter further comprises a third diode, a fourth diode, and a power connecting unit;

the third diode is electronically connected between the seventh port of the switch control module and the input circuit of the switch unit;

an anode of the third diode is electronically connected to the seventh port of the switch control module;

a cathode of the third diode is electronically connected to the input circuit of the switch unit;

the power connecting unit comprises a tenth positive connecting port and a tenth negative connecting port;

the tenth positive connecting port of the input circuit is electronically connected to an anode of the fourth diode;

the tenth negative connecting port of the power connecting unit is electronically connected to the seventh negative port;

a cathode of the fourth diode is electronically connected to the cathode of the third diode.

9. The emergency startup device as claimed in claim 8, wherein:

the power connecting unit is a USB connecting port.

* * * * *